United States Patent
Riley et al.

(10) Patent No.: US 6,801,970 B2
(45) Date of Patent: Oct. 5, 2004

(54) PRIORITY TRANSACTION SUPPORT ON THE PCI-X BUS

(75) Inventors: Dwight D. Riley, Houston, TX (US); Chris Pettey, Cedar Park, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 528 days.

(21) Appl. No.: 09/968,056

(22) Filed: Sep. 30, 2001

(65) Prior Publication Data

US 2003/0065842 A1 Apr. 3, 2003

(51) Int. Cl.$^7$ .................... G06F 13/40; G06F 13/42; G06F 13/36; G06F 9/46
(52) U.S. Cl. ............. 710/105; 710/107; 710/306; 710/313; 370/402
(58) Field of Search ...................... 710/105, 107, 710/100, 310, 52, 309, 112, 306, 240, 313, 315, 312; 370/402, 462; 709/200, 217; 340/825; 11/163

(56) References Cited

U.S. PATENT DOCUMENTS

| | | | | |
|---|---|---|---|---|
| 5,625,824 A | * | 4/1997 | Melo et al. | 710/240 |
| 5,987,555 A | * | 11/1999 | Alzien et al. | 710/312 |
| 6,175,889 B1 | * | 1/2001 | Olarig | 710/309 |
| 6,247,089 B1 | * | 6/2001 | Kuo et al. | 710/309 |
| 6,279,087 B1 | * | 8/2001 | Melo et al. | 711/146 |

OTHER PUBLICATIONS

"HARTIK 3.0: a portable system for developing real–time applications" by Lamastra, G.; Lipari, G.; Buttazzo, G.; Casile, A.: Conticelli, F. (abstract only).*

"A flexible compatible PCI interface for nuclear experiments" by Saleh, H.; Engels, R.; Reinartz, R.; Reiinhart, P; Rongen, F. (abstract only).*

* cited by examiner

*Primary Examiner*—Gopal C. Ray

(57) ABSTRACT

Support for indicating and controlling transaction priority on a PCI-X bus. Embodiments of the invention provide indicia that can be set to communicate to PCI-X-to-PCI-X bridges and Completer that a transaction should be handled specially and scheduled ahead of any other transaction not having their corresponding indicia set. A special handling instruction allows the priority transaction to be scheduled first or early. The indicia are implemented by setting a bit(s) in an unused portion of a PCI-X attribute field, or multiplexed with a used portion, to schedule the associated transaction as the priority transaction over other transactions that do not have their corresponding bit set. The present invention can be used for interrupt messaging, audio streams, video streams, isochronous transactions, or for high performance, low bandwidth control structures used for communication in a multiprocessor architecture across PCI-X.

32 Claims, 4 Drawing Sheets

PRIORITY TRANSACTION SUPPORT ON THE PCI-X BUS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

The present invention is related to scheduling transactions on computer bus systems, and in particular, support for priority transaction scheduling on computer bus systems employing the high-performance extension (PCI-X) to the peripheral component interconnect (PCI) protocol.

2. Description of the Related Art

PCI and PCI-X are bus systems widely used in computers. PCI-X provides performance improvements over PCI because PCI-X operates at higher clock frequencies made possible by a register-to-register protocol and other protocol enhancements, such as an attribute phase and split transactions. PCI-X also is supposed to lead to follow-on technologies that include better performance capabilities. This is important because with current PCI-X, if the rate of servicing a device on the bus requiring immediate servicing were to drop below a threshold, the computer system would crash. The device, for example, could be the computer system's main microprocessor. One possible improvement could be to enhance stability from computer system crashes and enhance the servicing of transactions for such devices to benefit performance.

Current PCI capable devices have a Scheduler to implement transaction Ordering Rules to determine which transaction in a queue will be handled next. The Ordering Rules are rules for emptying the queues. They are specified to guarantee a consistent view of data by all devices in the system and rational behavior between multiple devices and their software drivers (if any). Conventional PCI Ordering Rules apply globally to all transactions without regard to the underlying communications semantics. The Relaxed Ordering attribute in PCI-X transactions allows certain ordering requirements to be indicated explicitly on a transaction-by-transaction basis, providing a tool to help system designers and software writers achieve better overall performance. The current PCI capable devices, however, have no way of determining the relative priority between transactions communicated to them from other devices. The current PCI-X protocol and scheduling is still subject to system crashes because a clear priority usage model is not provided for devices that should have priority for exclusive or early handling.

There are three types of queues that the Scheduler controls. These queues are the Posted Write, Completion, and Request queues, each of which handles a different transaction class. Certain classes of transactions are permitted to bypass other classes for handling next, and other transactions are not so permitted. For example, the PCI-X Relaxed Ordering attribute may be used to allow a memory write transaction to pass other memory writes and to allow a Split Read Completion to pass memory writes.

Therefore, for these and other reasons it is imperative to improve transaction handling priority without adding cost to the system. A better transaction handling scheme may predicate the longevity of PCI-X.

SUMMARY OF THE INVENTION

Embodiments of the present invention feature support for controlling transaction priority for PCI-X. These embodiments provide indicia of priority to communicate to PCI-X-to-PCI-X bridges that a transaction tagged by the indicia should be scheduled, using a special handling instruction, ahead of any other transaction not invoking this special handling instruction. The special handling instruction allows the priority transaction to be scheduled first. The indicia of priority can be implemented by setting an unused bit(s) in a PCI-X attribute field or multiplexed with another used signal bit(s) to schedule the associated transaction as the priority transaction over the other transactions that do not have their corresponding bit set. The present invention is useful for interrupt messaging, audio streams, video streams, isochronous transactions or for high performance, low bandwidth control structures used for communication in a multiprocessor architecture across PCI-X.

Embodiments of the present invention feature a technique, in a computer system, of providing indicia of priority for PCI-X transactions. According to the technique, a plurality of PCI-X phases is created in the computer system. A transaction priority mechanism for PCI-X is provided in the computer system by inserting priority indicia into an unused attribute portion (e.g., at the location of an unused bit(s)) of the plurality of PCI-X phases.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF INVENTION

PCI-X is described in the *PCI-X Addendum to the PCI Local Bus Specification, Revision* 1.0 (the PCI-X specification) and in U.S. Pat. No. 6,266,731B1 to Riley et al., entitled High Speed Peripheral Interconnect Apparatus, Method and System, which are incorporated by reference herein in their entireties. PCI is described in the *PCI Local Bus Specification, Revision* 2.2 (the general PCI specification), which also is incorporated by reference in its entirety. When PCI is mentioned herein, it is meant to include all of PCI, including PCI-X, and when PCI bus, the bus operating in PCI mode, or PCI device are mentioned herein, they are meant to include PCI-X. Full PCI protocol refers to the PCI protocol that includes PCI-X.

The present invention provides a technique for enhancing the operation of computer system buses that use the extensions to the peripheral component interconnect specification (i.e., PCI-X), as well as logic circuits and signal protocols thereof. The technique is fully backward compatible with current PCI and PCI-X systems or devices, and such systems or devices that do not recognize the signals and techniques provided for in the present invention will simply ignore them. For illustrative purposes, embodiments of the present invention are described herein for computer systems using Intel Corporation microprocessor architectures, and certain terms and references are specific to such processor platforms. PCI-X and the enhancements described herein according to the present invention, however, are hardware independent, and may be used with any host computer designed for this interconnect standard. As will be appreciated by those skilled in the art of computer systems, the present invention may be adapted and applied to any computer platform using the PCI-X standard and other standards.

Figure 1:
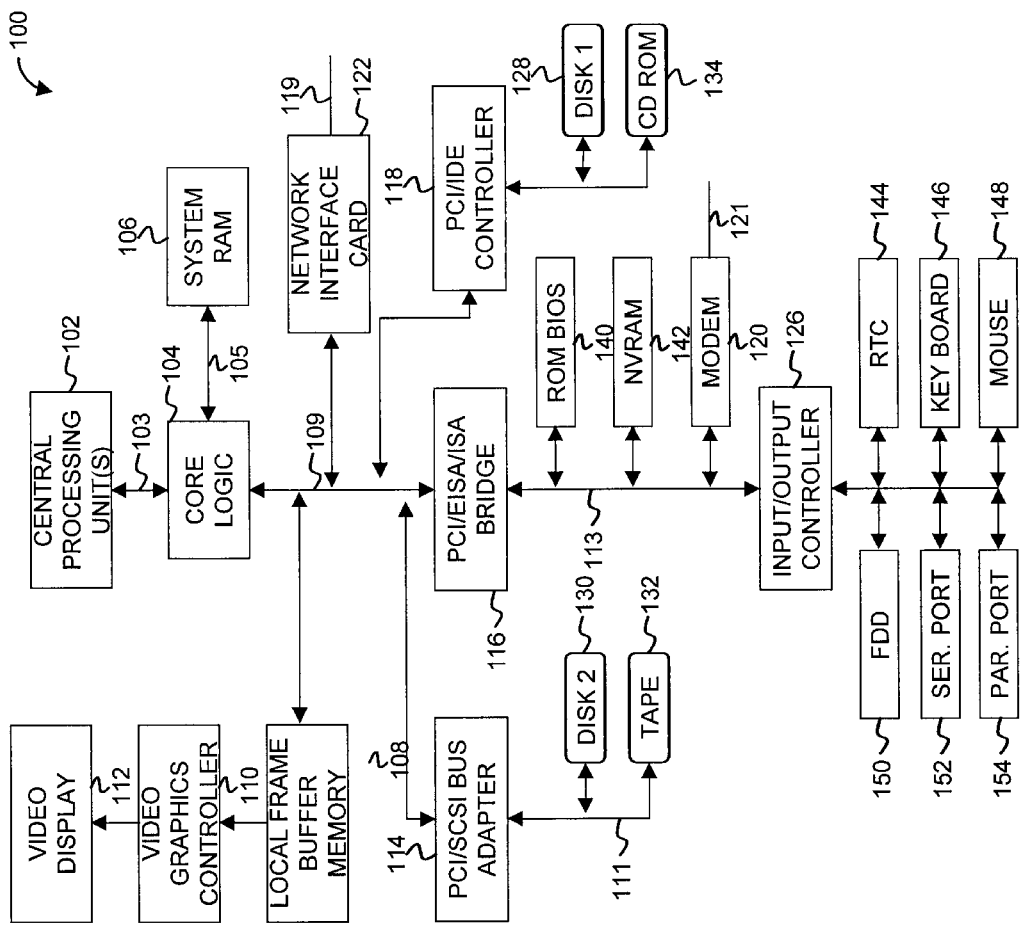
FIG. 1 is an exemplary schematic block diagram of a computer system in accordance with an embodiment of the invention.

Referring to FIG. 1, an exemplary schematic block diagram of a computer system according to the present invention is illustrated. The computer system is generally indicated by the numeral 100 and includes central processing unit(s) (CPU) 102, core logic 104 ("North Bridge"), system random access memory (RAM) 106, a video graphics controller 110, a local frame buffer 108, a video display 112, a PCI/SCSI bus adapter 114, a PCI/EISA/ISA bridge 116 ("South Bridge"), a PCI/IDE controller 118, and, optionally, a network interface card (NIC) 122. Single or multilevel cache memory (not illustrated) may also be included in the computer system 100 according to the current art of microprocessor computer systems. The CPU 102 may be a plurality of CPUs 102 in a symmetric or asymmetric multi-processor configuration.

The CPU 102 is connected to the core logic 104 through a CPU host bus 103. The system RAM 106 is connected to the core logic 104 through a memory bus 105. The core logic 104 includes a host-to-PCI bridge between the host bus 103, the memory bus 105 and a PCI bus 109. More than one PCI bus is contemplated herein as well as PCI-X-to-PCI-X bridges (not illustrated), and is within the scope and intent of the present invention. The local frame buffer 108 is connected between the video graphics controller 110 and the PCI bus 109. The PCI/SCSI bus adapter 114, PCI/EISA/ISA bridge 116, PCI/IDE controller 118 and the NIC 122 are connected to the PCI bus 109. Some of the PCI devices, such as the Video controller 110 and NIC 122, may plug into PCI connectors on the computer system 100 motherboard (FIG. 2).

Hard disk 130 and tape drive 132 are connected to the PCI/SCSI bus adapter 114 through a SCSI bus 111. The NIC 122 may be connected to a local area network 119. The PCI/EISA/ISA bridge 116 connects over an EISA/ISA bus 113 to a ROM BIOS 140, non-volatile random access memory (NVRAM) 142, modem 120, and input-output controller 126. The modem 120 connects to a telephone line 121. The input-output controller 126 interfaces with a keyboard 146, real time clock (RTC) 144, mouse 148, floppy disk drive (FDD) 150, serial port 152, and parallel port 154. The EISA/ISA bus 113 is a slower information bus than the PCI bus 109, but its interfacing cost is less.

When the computer system 100 is first turned on, start-up information stored in the ROM BIOS 140 is used to begin operation thereof. Basic setup (BIOS) instructions are stored in the ROM BIOS 140 so that the computer system 100 can load more complex operating system (OS) software from a memory storage device, such as the disk 130. Before the operating system software can be loaded, however, certain hardware in the computer system 100 is configured to properly transfer information from the disk 130 to the CPU 102. In the computer system 100 illustrated in FIG. 1, the PCI/SCSI bus adapter 114 is configured to respond to commands from the CPU 102 over the PCI bus 109 and transfer information from the disk 130 to the CPU 102 via buses 109 and 103. The PCI/SCSI bus adapter 114 is a PCI device and remains platform independent. Therefore, separate hardware independent commands are used to setup and control any PCI device in the computer system 100. These hardware independent commands, however, are located in PCI BIOS contained in the computer system ROM BIOS 140. The PCI BIOS is firmware that is hardware specific but meets the general PCI specification. Plug and play and PCI devices in the computer system are detected and configured when a system configuration program is executed. The results of the plug and play and PCI device configurations are stored in the NVRAM 142 for later use by the startup programs in the ROM BIOS 140 and the PCI BIOS that configure the necessary computer system 100 devices during startup. Also during startup a built-in-self-test (BIST) may perform diagnostic testing of components, such as PCI devices, in the computer system.

Figure 2:
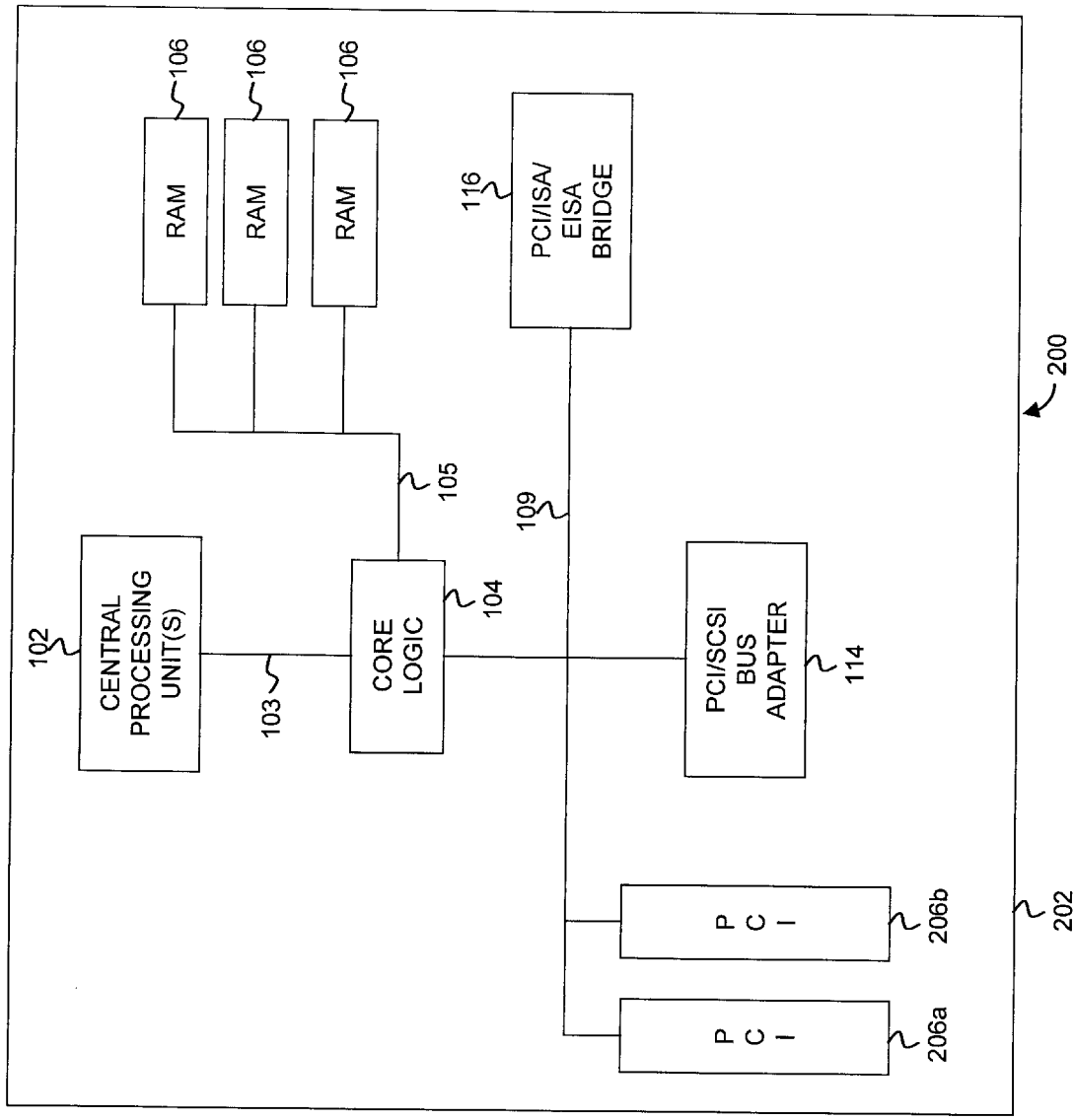
FIG. 2 is an exemplary schematic diagram of a printed circuit motherboard of the computer system of FIG. 1.

Referring to FIG. 2, a schematic diagram of an exemplary computer system motherboard according to FIG. 1 is illustrated. The computer system motherboard 200 includes printed circuit board 202, on which components and connectors are mounted. The printed circuit board 202 includes conductive printed wiring used to interconnect these components and connectors. The conductive printed wiring (illustrated as buses 103, 105 and 109) may be arranged into signal buses having controlled impedance and signaling characteristics. Illustrated on the printed circuit board 202 are the core logic 104, CPU(s) 102, RAM 106, embedded PCI/ISA/EISA bridge 116, embedded PCI/SCSI bus adapter 114, and PCI connectors 206a, 206b (connectors are the same for PCI and PCI-X). The motherboard 200 may be assembled into a case with a power supply, disk drives, etc. (not illustrated), which form the computer system 100 of FIG. 1.

The present invention provides support for priority transactions on the PCI bus, which can be implemented in the computer system of FIGS. 1 and 2, as well as in a variety of other computer systems and computer buses. For example, the present invention could be implemented in a computer system employing a serial point-to-point bus, such as 3GIO by Intel Corporation, or another one employing a parallel bus, such as HyperTransport™. In accordance with embodiments of the invention, indicia of a priority transaction are provided to communicate to PCI-X-to-PCI-X bridges and the Completer device that the transaction is an exclusive priority transaction that should be scheduled by the Scheduler using a special handling instruction. The priority transaction is scheduled ahead of any other transaction that does not have this indicia set, thereby allowing priority transactions to be scheduled first or early. Embodiments of the present invention implement these indicia by setting a bit in a PCI-X attribute field of the transaction that schedules the associated transaction as the priority transaction ahead of other transactions that do not have the corresponding bit set. In a sense, the present invention implements a simplistic quality of service technique across the interconnect. The present invention can be used for interrupt messaging, audio streams, video streams, isochronous transactions, or for high performance, low bandwidth control structures used for communication in a multiprocessor architecture across PCI-X.

Figure 3:
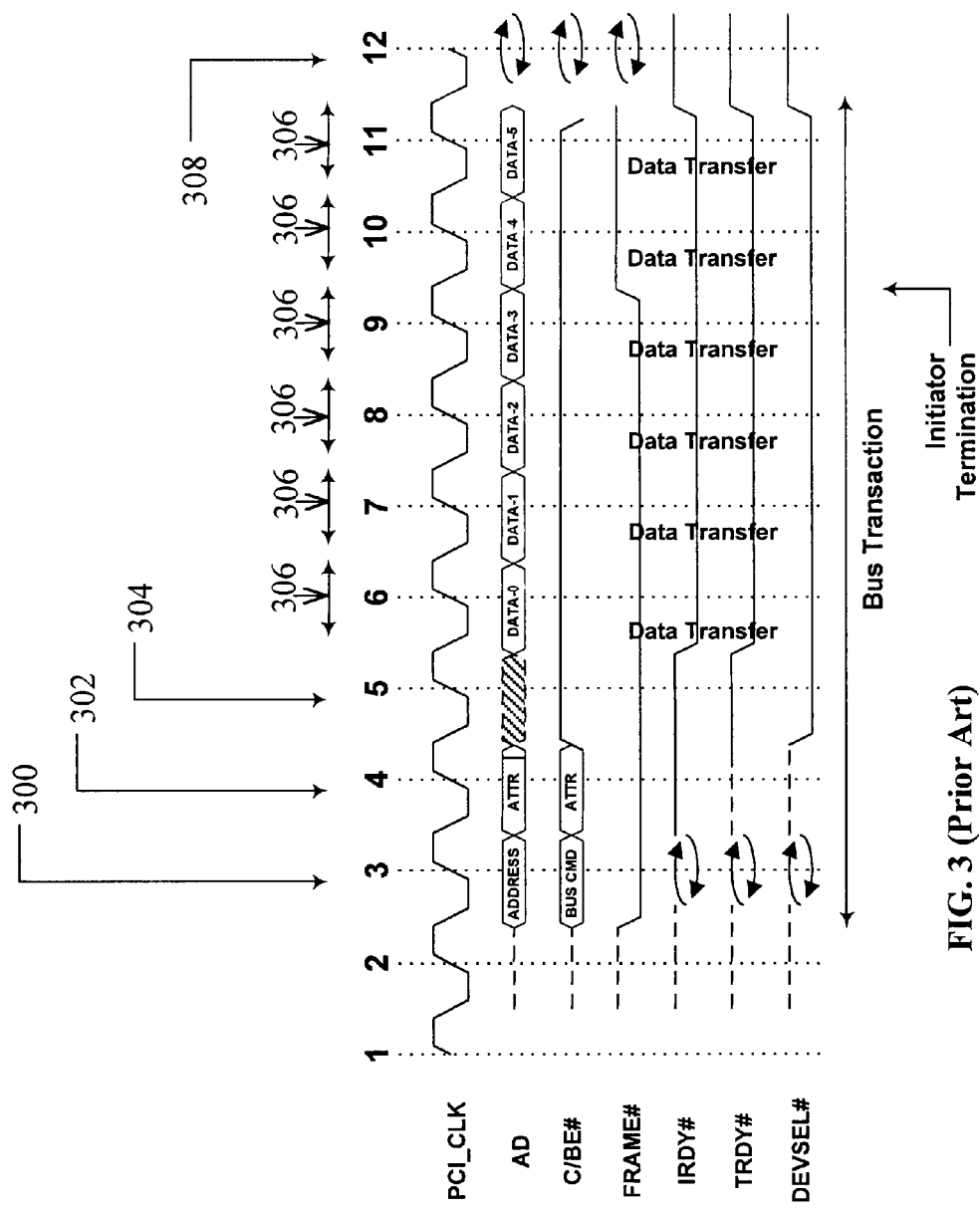
FIG. 3 illustrates a prior art PCI-X Memory Write Block (32-bit or 64-bit) or Split Completion transaction identifying all the PCI-X transaction phases, in accordance with an embodiment of the invention.

FIG. 3 illustrates a prior art PCI-X Memory Write Block (32-bit or 64-bit) or Split Completion transaction identifying all the PCI-X transaction phases, in accordance with an embodiment of the invention. A PCI-X bus transaction or transfer consists of one (or more) address phases, an attribute phase, and any number of data phases transferred across an interconnect to a device, for example, a peripheral device, within or without the computer system. The PCI-X transaction is a combination of address 300, attribute 302, clock (target response) 304, and data 306 phases. The transaction shown in FIG. 3 also includes a bus turn-around 308 phase. The transaction is signaled by a single assertion or activation of FRAME# on the bus, such as the PCI-X bus 109 of FIGS. 1 and 2, as will be appreciated by those skilled in the art. The attribute phase 302 is the clock after the address phase 300, as shown in prior art FIG. 3. The attribute phase 302 uses a 36-bit attribute field contained on Address and Data lanes AD[31:0] and Bus Command and Byte Enables lanes C/BE[3:0]# (i.e., the lower bus halves) during the attribute phase of a PCI-X transaction, as schematically shown in FIG. 3.

The attribute field defines and describes each PCI-X bus transaction in more detail than the conventional PCI specification allows. It contains several bit assignments that include information about the size of the transaction (byte count), bus number, ordering of transactions, cache snooping requirements, sequence number, identity of the transaction initiator or device addressed by the transaction, and other transaction handling instructions. The attributes appear in the clock immediately following the address phase on the AD bus, as indicated in FIG. 3. According to the PCI-X specification, the initiator of every transaction drives attributes on the C/BE[3:0]# and AD[31:0] buses in the attribute phase. The attribute phase is always a single clock regardless of the width of the data transfer or the width of the address (single or dual address cycle).

The upper bus halves (AD[63:32]) and (C/BE[7:4]#) of 64-bit devices are reserved and driven high (RDH) during the attribute phase 302, as will be appreciated by those skilled in the art. These upper bus halves are unused bits in PCI-X that are available for the present invention. Some other bits also may be unused (e.g., reserved bits) and available in the lower bus halves (AD[31:0]) and (C/BE [3:0]).

Figures 4, 5:
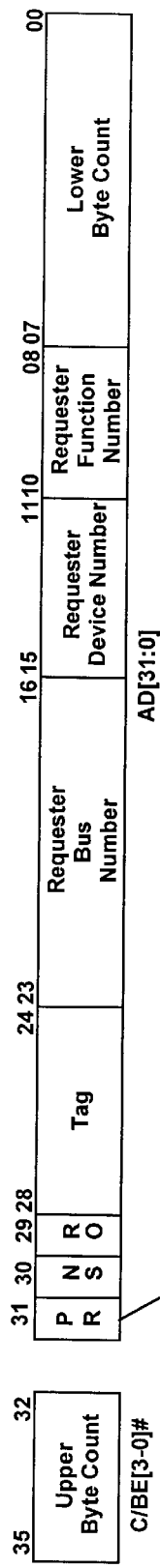
FIG. 4 illustrates Burst Transaction Requester Attribute Bit assignment in accordance with an embodiment of the invention.
FIG. 5 illustrates DWORD Transaction Requester Attribute bit assignment in accordance with an embodiment of the invention.

FIG. 4 illustrates a BURST Transaction Requester Attribute Bit assignment in accordance with an embodiment of the invention. As will be appreciated by those skilled in the art, the Requester is the original initiator of a transaction. FIG. 4 is similar to a conventional PCI-X bit assignment except for the use of an unused bit(s) in the attribute phase 302. According to the present invention, the bit assignment for the attribute phase 302 includes priority (PR) indicia or tag 400, for example, in the lower bus half (AD[31:0]) of the AD lanes., as shown in FIG. 4. The indicia in general consist of a bit(s) chosen and designated from the unused bits. In this exemplary embodiment, the indicia 400 are located at bit 31, which is normally reserved in conventional PCI-X. The indicia 400 are set to communicate to a PCI-X-to-PCI-X bridge or other PCI-X compatible device, or other bridge or device (not shown) receiving the transaction information in (or outside) the computer system (e.g., the computer system 100 of FIG. 1) that the transaction in which it is set is tagged for exclusive priority to be scheduled for immediate handling ahead of any other transaction not having the analogous indicia set. The location of the indicia 400 is merely exemplary in FIG. 4. In other embodiments, it could instead replace any other unused bit(s) (e.g., reserved, such as RDH), or be multiplexed with any other bit(s) signals already being used in the attribute phase 302, as will be appreciated by those skilled in the art.

FIG. 5 illustrates DWORD Transaction Requester Attribute bit assignment in accordance with an embodiment of the invention. The bit assignment in FIG. 5 includes indicia 500 (e.g., a bit(s)) at the position of conventionally reserved bit 31 in the lower bus half of the AD lane. Indicia 500 are like the indicia 400 of FIG. 4, but for a DWORD transaction rather than a burst transaction. Again, FIG. 5 is merely exemplary and the specific location of indicia 500 can be different, as discussed above.

In certain other embodiments according to the invention, the tagged priority transaction instead could be handled by the Scheduler earlier than some other transactions not having the indicia 400 or 500 set (i.e., untagged), but not necessarily earlier than all untagged transactions. This would be implemented according to the special handling instruction used by the Scheduler.

In yet other embodiments of the invention, the tagged transaction could be implemented similarly, but not equivalently, to a PCI-X Relaxed Ordering transaction that uses the set indicia 400 or 500 as a Relaxed Ordering bit (or relaxed ordered attribute bit) to invoke another special handling instruction allowing certain ordering requirements to be indicated explicitly on a transaction-by-transaction basis. For example, the PCI-X Relaxed Ordering attribute may be used to allow the tagged transaction to pass memory writes or other transactions, as will be appreciated by those skilled in the art. In other embodiments of the invention, the tagged transaction, by setting the indicia 400 or 500, could be implemented to meet the PCI-X Ordering Rules that use the Scheduler to determine which transaction in a queue will be handled next, but handling the tagged transaction as soon as possible. Alternatively, in another embodiment, the tagged transaction could be implemented as a sort of combination of the previous two embodiments just discussed in which the indicia 400 or 500 is used in conjunction with the Relaxation Ordering bit. In this embodiment, if the indicia 400 or 500 is set for a tagged transaction but the Relaxation Ordering bit is not set for that transaction, then the tagged transaction is handled as an exclusive priority transaction to be handled next immediately by the PCI-X-to-PCI-X bridge. On the other hand, if both the indicia 400 or 500 and the Relaxation Ordering bit are set, then the tagged transaction is handled only as a Relaxation Ordering transaction as soon as possible, as above.

Still other embodiments of the invention require that another attribute be created and carried in the attribute phase 302 in FIG. 3. Alternatively, one or more reserved bits in conventional PCI-X could be replaced with indicia (e.g., a bit(s)) to create and carry this new attribute in the attribute phase 302. Conventional PCI-X supports various classes of commands with their own set of attributes, including Burst, DWORD, Split Completion/Exception Message, and Configuration. These commands are carried in the C/BE# lanes. For the present embodiments, a new class of command would be created having its own attribute. The new class of command would invoke another special handling instruction for the Scheduler to handle the transaction as a priority transaction. This additional attribute could be created by a command in the C/BE# lane RDH bits, or multiplexed with another bit in the C/BE# lanes. This represents a deviation from the PCI-X specification. If the priority transaction is a DWORD transaction, another possibility is for this new command to be covered in an unused bit(s) in the DWORD transaction's byte count field, which is not used in DWORD transactions, or the indicia 500 itself could be located and set in a priority DWORD transaction's unused bit(s) in its byte count field, as will be appreciated by those skilled in the art. This new attribute could be RDH throughout, but have indicia like the indicia 500 of FIG. 5 (e.g., a bit(s)) that could be set so that the transaction becomes a priority transaction for special handling as in any of the other embodiments described herein using an unused bit(s).

The present invention does not guarantee the rate of delivery, but for a priority transaction, it only places the tagged transaction at the head of the queue for service by the PCI-X-to-PCI-X bridge and the Completer or other device. The present invention can be implemented in 32-bit or 64-bit extensions to the PCI-X protocol.

The foregoing disclosure and description of the preferred embodiment are illustrative and explanatory thereof, and various changes in the components, circuit elements, circuit configurations, signals, and signal connections, as well as in the details of the illustrated circuitry and construction and method of operation may be made without departing from the spirit and scope of the invention.

What is claimed is:

1. A method, in a computer system, of supporting transaction priority for PCI-X, the method comprising:
   creating a plurality of PCI-X phases for the transaction in the computer system; and
   inserting priority indicia into an unused portion of the plurality of PCI-X phases for the transaction.

2. The method of claim 1, wherein the inserting comprises inserting the indicia into an attribute phase of the plurality of PCI-X phases.

3. The method of claim 1, wherein the inserting comprises inserting the indicia into a reserved and driven high portion of an attribute phase of the plurality of PCI-X phases.

4. The method of claim 1, wherein the inserting comprises inserting the error correction code into a reserved and driven high portion of an attribute phase of the plurality of PCI-X phases.

5. The method of claim 1, wherein the inserting comprises inserting the indicia into a PCI-X C/BE[3:0]# portion of the plurality of PCI-X phases.

6. The method of claim 1, wherein the inserting comprises inserting the indicia into a PCI-X C/BE[7:4]# portion of the plurality of PCI-X phases.

7. The method of claim 1, wherein the inserting comprises inserting the indicia into an upper half portion of a PCI-X attribute phase of the plurality of PCI-X phases.

8. The method of claim 1, wherein the inserting comprises using an unused bit(s) in an attribute phase of the plurality of PCI-X phases.

9. The method of claim 1, further comprising transferring the indicia across an interconnect in the computer system to a peripheral device.

10. The method of claim 9, wherein the peripheral device is a PCI-X-to-PCI-X bridge, and wherein the transferring comprises transferring the indicia across the interconnect in the computer system to PCI-X-to-PCI-X bridge.

11. The method of claim 9, wherein the peripheral device is PCI-X compatible device, and wherein the transferring comprises transferring the indicia across the interconnect in the computer system to the PCI-X compatible device.

12. The method of claim 1, wherein the inserting comprises inserting the indicia into a PCI-X AD[63:32]# portion of the plurality of PCI-X phases.

13. The method of claim 1, wherein the inserting comprises inserting the indicia into a PCI-X AD[31:0]# portion of the plurality of PCI-X phases.

14. The method of claim 1, wherein the indicia are not inserted into an unused portion of the plurality of PCI-X phases, but instead inserting the indicia into a used portion of the plurality of PCI-X phases for multiplexing signals associated with the indicia with other signals associated with the used portion.

15. The method of claim 1, wherein the inserting comprises using unused bit(s) of an attribute phase of the plurality of PCI-X phases and setting the bit(s) as an indication of priority.

16. The method of claim 1, wherein the creating comprises creating a first and a second attribute phase in the plurality of PCI-X phases, deviating form the PCI-X standard, and wherein the inserting comprises inserting the indicia into the second attribute of the plurality of PCI-X phases.

17. The method of claim 1, wherein the inserting comprises inserting the priority indicia such that use of the priority indicia is fully backward compatible with the full PCI protocol.

18. A computer system comprising:
   a central processing unit connected to a host bus;
   a random access memory connected to a system memory bus;
   an extended peripheral component interconnect (PCI-X) bus operating according to a PCI-X protocol;
   a core logic chip coupled as a first interface bridge between the host bus and the system memory bus, as a second interface bridge between the host bus and the PCI-X bus, and as a third interface bridge between the system memory bus and the PCI-X bus; and
   a PCI-X device coupled to the PCI-X bus, the PCI-X device operating according to the PCI-X protocol, the PCI-X device adapted to provide a plurality of PCI-X phases in a PCI-X transaction and insert transaction priority indicia into an unused portion of the plurality of PCI-X phases.

19. The computer system of claim 18, wherein the indicia are inserted into an attribute phase portion of the plurality of PCI-X phases.

20. The computer system of claim 18, wherein the indicia are inserted into a C/BE[3:0]# portion of the plurality of PCI-X phases.

21. The computer system of claim 18, wherein the indicia are inserted into a C/BE[7:4]# portion of the plurality of PCI-X phases.

22. The computer system of claim 18, wherein the indicia are inserted into an AD[63:0]# portion of the plurality of PCI-X phases.

23. The computer system of claim 18, wherein the indicia are inserted into an AD[63:32]# portion of the plurality of PCI-X phases.

24. The computer system of claim 18, wherein the indicia are inserted into an AD[31:0]# portion of the plurality of PCI-X phases.

25. The computer system of claim 18, wherein the plurality of PCI-X phases has an unused reserved and driven high portion, and wherein the indicia are inserted into the unused reserved and driven high portion.

26. The computer system of claim 18, further comprising a PCI-X-to-PCI-X bridge coupled to the PCI-X device, wherein the PCI-X device transfers the indicia to the PCI-X-to-PCI-X bridge for use by the PCI-X-to-PCI-X bridge to control transaction priority handling.

27. The computer system of claim 18, wherein the indicia are not inserted into an unused portion of the plurality of PCI-X phases, but instead are inserted into a used portion of the plurality of PCI-X phases for multiplexing signals associated with the indicia with other signals associated with the used portion.

28. The computer system of claim 18, wherein the indicia comprises a bit(s).

29. The computer system of claim 18, wherein use of the indicia is fully backward compatible with the full PCI protocol.

30. A method of identifying a transaction as a priority transaction on a PCI-X bus, the method comprising:

creating a plurality of PCI-X transaction phases including a PCI-X attribute phase having an unused portion of the attribute phase;

inserting priority indicia into the unused portion of the attribute phase; and setting the indicia to indicate that the transaction is a priority transaction.

31. The method of claim 30, wherein the inserting comprises using unused bit(s) of the attribute phase and the setting comprises setting the bit(s).

32. The method of claim 30, wherein the inserting comprises inserting the priority indicia such that use of the priority indicia is fully backward compatible with the full PCI protocol.

* * * * *